(12) United States Patent
Yanagi et al.

(10) Patent No.: US 11,256,927 B2
(45) Date of Patent: Feb. 22, 2022

(54) INFORMATION PROVISION DEVICE, VEHICLE, DRIVING ASSISTANCE SYSTEM, MAP GENERATION DEVICE, DRIVING ASSISTANCE DEVICE, AND DRIVING ASSISTANCE METHOD

(71) Applicant: TOYOTA JIDOSHA KABUSHIKI KAISHA, Toyota (JP)

(72) Inventors: Takuro Yanagi, Toyota (JP); Maki Tamura, Nisshin (JP); Mutsumi Matsuura, Okazaki (JP); Toshihiko Inoue, Toyota (JP); Naoki Yamamuro, Nagoya (JP); Takashi Hayashi, Aichi-gun (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 16/697,546

(22) Filed: Nov. 27, 2019

(65) Prior Publication Data

US 2020/0202141 A1    Jun. 25, 2020

(30) Foreign Application Priority Data

Dec. 21, 2018   (JP) .............................. JP2018-240117

(51) Int. Cl.
*G06K 9/00*      (2006.01)
*G08G 1/0965*    (2006.01)
(Continued)

(52) U.S. Cl.
CPC ..... *G06K 9/00791* (2013.01); *G06K 9/00335* (2013.01); *G06K 9/00832* (2013.01);
(Continued)

(58) Field of Classification Search
CPC .......... G06K 9/00791; G06K 9/00335; G06K 9/00832; B60R 11/04; G01S 19/42;
(Continued)

(56) References Cited

U.S. PATENT DOCUMENTS 5,638,116 A * 6/1997 Shimoura ............ G05D 1/0246
                                                  348/118
6,030,056 A * 2/2000 Sawada ..................... B60T 8/00
                                                  303/113.5
(Continued)

FOREIGN PATENT DOCUMENTS

DE    102008057986 A1 * 5/2010 ............... B62D 6/00
JP      2004-205348 A    7/2004

OTHER PUBLICATIONS

Translated version of DE-102008057986-A1 (Year: 2010).*
(Continued)

*Primary Examiner* — Carol Wang
(74) *Attorney, Agent, or Firm* — Oblon, McClelland, Maier & Neustadt, L.L.P.

(57) ABSTRACT

An information provision device includes a controller configured to detect installation of an anti-skid tool onto a vehicle from an image including at least a part of the vehicle and at least a part of the vicinity of the vehicle and a communication unit configured to provide position information of the vehicle at the time of the installation of the anti-skid tool detected by the controller. A driving assistance device includes a communication unit configured to acquire position information of a vehicle at the time of installation of an anti-skid tool when the installation of the anti-skid tool onto the vehicle is detected from an image including at least a part of the vehicle and at least a part of a vicinity of the vehicle, and a controller configured to present information
(Continued)

acquired by the communication unit to the driver of another vehicle different from the vehicle.

11 Claims, 5 Drawing Sheets

(51) Int. Cl.
  *G01S 19/42* (2010.01)
  *B60R 11/04* (2006.01)
(52) U.S. Cl.
  CPC ............... *B60R 11/04* (2013.01); *G01S 19/42* (2013.01); *G08G 1/0965* (2013.01)
(58) Field of Classification Search
  CPC .. G08G 1/0965; G08G 1/0112; G08G 1/0133; G08G 1/0141; G08G 1/096716; G08G 1/096791; G08G 1/09675; G08G 1/096775; B60Q 1/503
  See application file for complete search history.

(56) References Cited

U.S. PATENT DOCUMENTS

| | | | |
|---|---|---|---|
| 2004/0145496 A1* | 7/2004 | Ellis | G08G 1/127 340/905 |
| 2013/0083188 A1* | 4/2013 | Mian | G01B 11/06 348/135 |
| 2018/0093650 A1* | 4/2018 | Payne | B60T 8/172 |

OTHER PUBLICATIONS

Cheng, Qi, and Yong Liu. "Research on Automatic Anti-skidding Technology of Vehicle Ice-snow Area." In 2018 IEEE International Conference of Safety Produce Informatization (IICSPI), pp. 462-465. IEEE, 2018. (Year: 2018).*

* cited by examiner

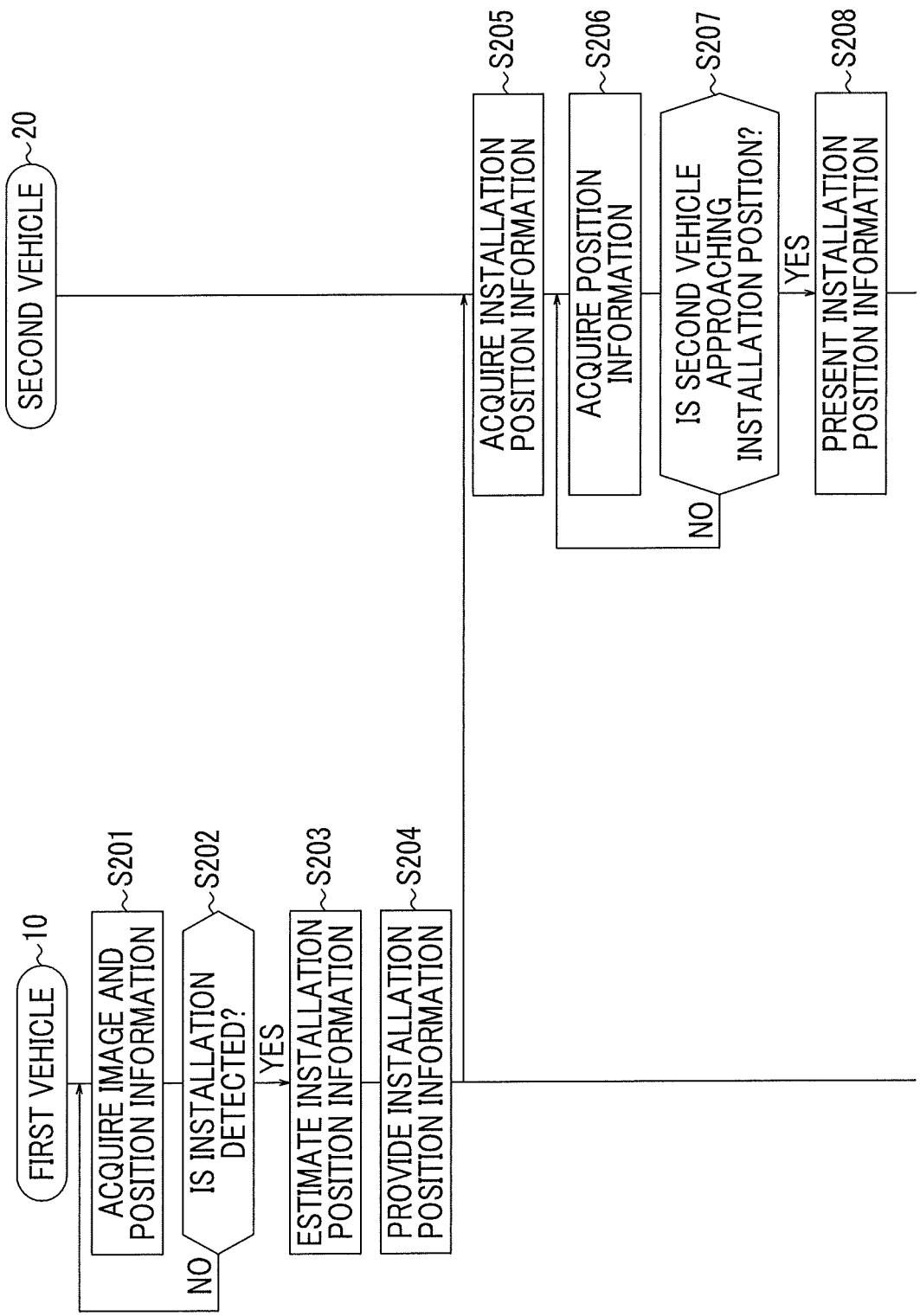

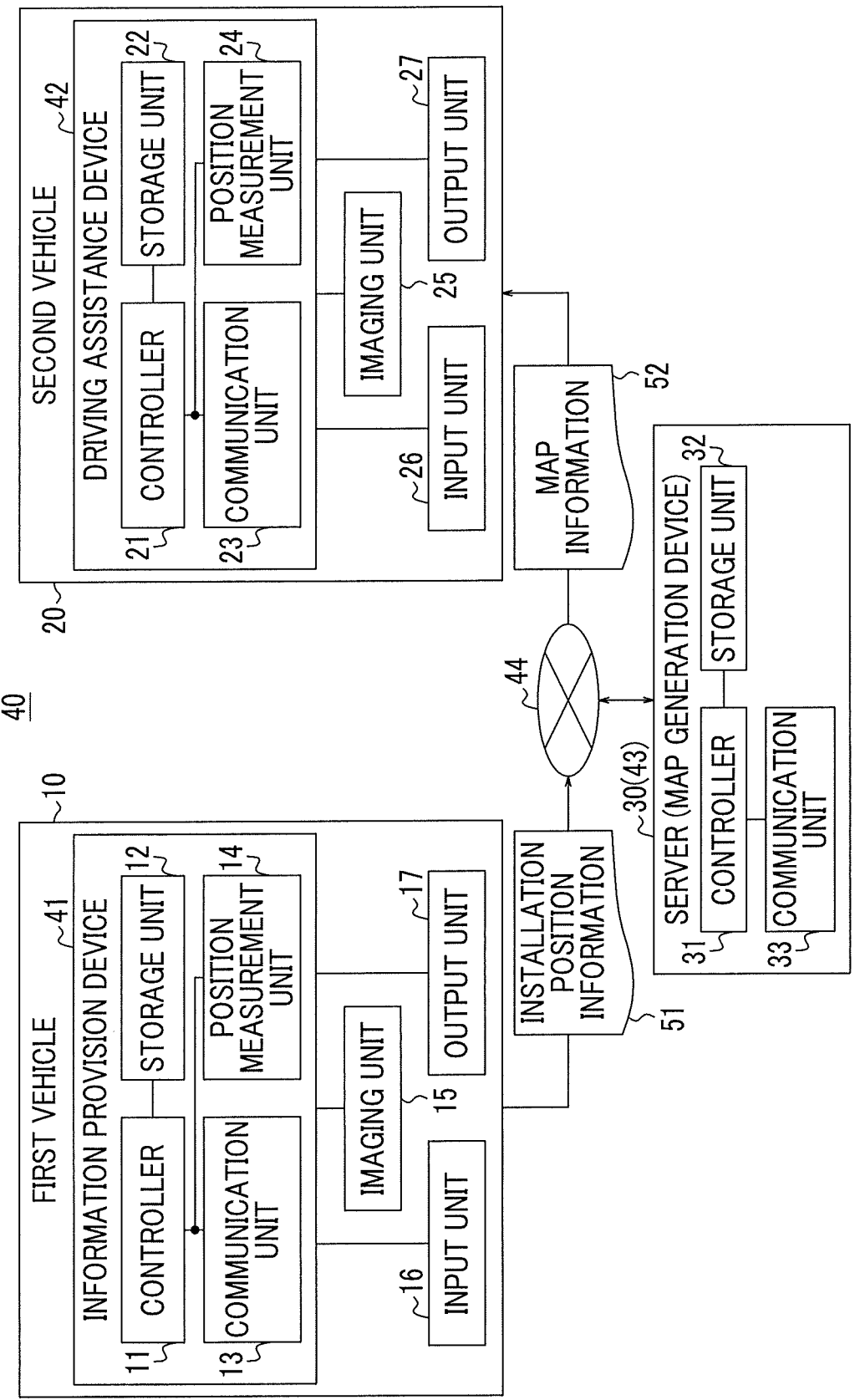

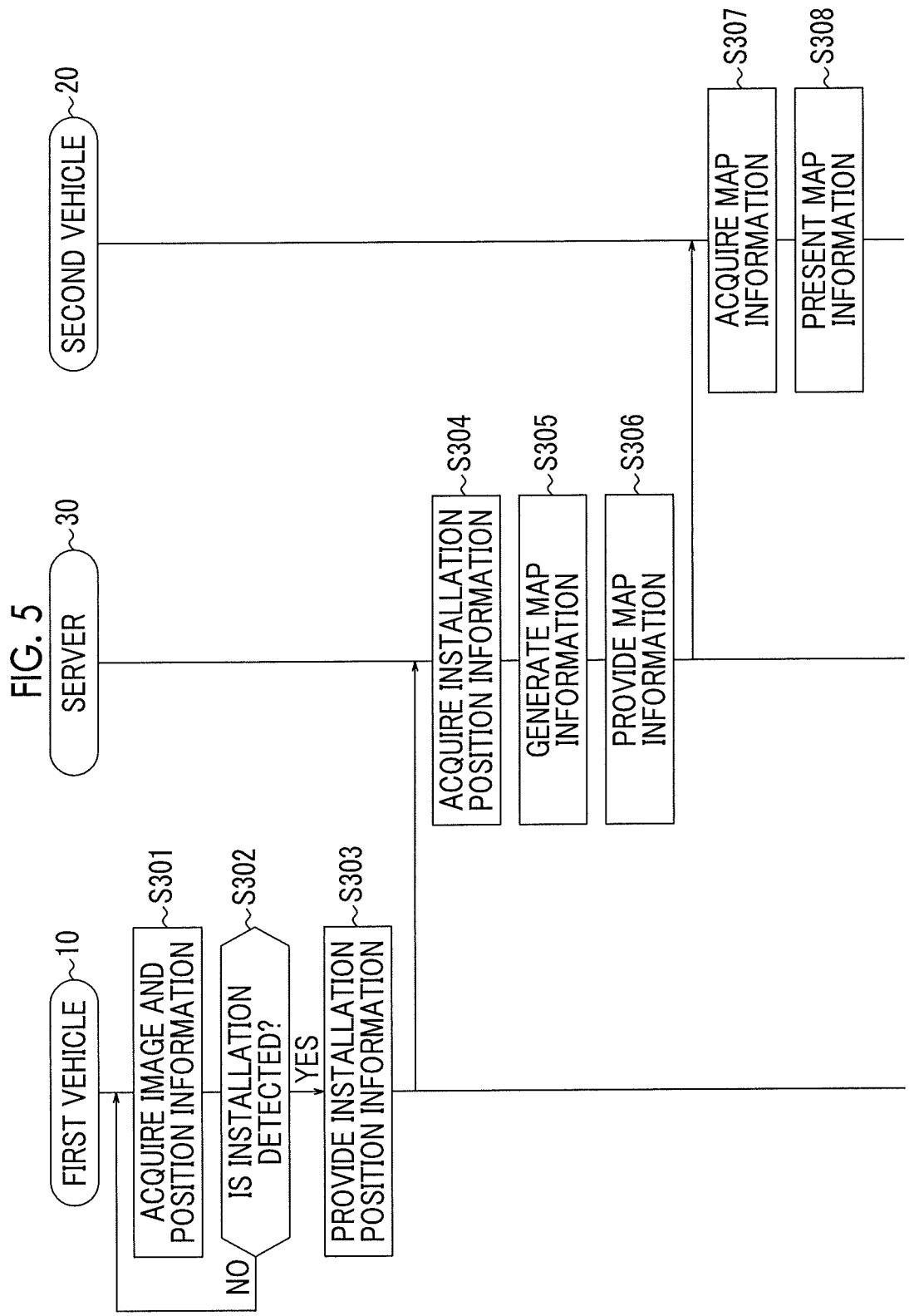

INFORMATION PROVISION DEVICE, VEHICLE, DRIVING ASSISTANCE SYSTEM, MAP GENERATION DEVICE, DRIVING ASSISTANCE DEVICE, AND DRIVING ASSISTANCE METHOD

INCORPORATION BY REFERENCE

The disclosure of Japanese Patent Application No. 2018-240117 filed on Dec. 21, 2018 including the specification, drawings and abstract is incorporated herein by reference in its entirety.

BACKGROUND

1. Technical Field

The disclosure relates to an information provision device, a vehicle, a driving assistance system, a map generation device, a driving assistance device, and a driving assistance method.

2. Description of Related Art

A technique, in which an instruction to attach a chain is issued when a determination is made that the snowy road rank of a road on which a vehicle is about to travel is higher than the snowy road rank of a road on which the vehicle is currently traveling, is described in Japanese Unexamined Patent Application Publication No. 2004-205348 (JP 2004-205348 A).

SUMMARY

In the technique described in JP 2004-205348 A, a snowy road rank is set for each road based on weather data and the possibility of freezing and snow accumulation. However, the necessity of attaching a chain may change depending on another factor such as inclination instead of the weather data and the possibility of freezing and snow accumulation. Therefore, it is difficult to accurately determine at which place a chain is to be attached only by comparing snowy road ranks.

The disclosure provides an information providing device, a vehicle, a driving assistance system, a map generating device, a driving assistance device, and a driving assistance method with which it is possible to accurately determine at which place an anti-skid tool needs to be installed.

A first aspect of the disclosure relates to an information provision device including a controller and a communication unit. The controller is configured to detect installation of an anti-skid tool onto a vehicle from an image including at least a part of the vehicle and at least a part of the vicinity of the vehicle. The communication unit is configured to provide position information of the vehicle at the time of the installation of the anti-skid tool which is detected by the controller.

A second aspect of the disclosure relates to a map generation device including a communication unit and a controller. The communication unit is configured to acquire position information of a vehicle at the time of installation of an anti-skid tool in a case where the installation of the anti-skid tool onto the vehicle is detected from an image including at least a part of the vehicle and at least a part of the vicinity of the vehicle. The controller is configured to generate, based on the position information of the vehicle which is acquired by the communication unit, map information indicating a location at which the anti-skid tool needs to be installed.

A third aspect of the disclosure relates to a driving assistance device including a communication unit and a controller. The communication unit is configured to acquire position information of a vehicle at the time of installation of an anti-skid tool or map information in a case where the installation of the anti-skid tool onto the vehicle is detected from an image including at least a part of the vehicle and at least a part of the vicinity of the vehicle, the map information being generated based on the position information of the vehicle and indicating a location at which the anti-skid tool needs to be installed. The controller is configured to present information acquired by the communication unit to the driver of another vehicle different from the vehicle.

A fourth aspect of the disclosure relates to a driving assistance method. The driving assistance method includes capturing an image including at least a part of a vehicle and at least a part of the vicinity of the vehicle by an imaging unit, detecting installation of an anti-skid tool onto the vehicle from the image captured by the imaging unit by a controller, and outputting position information of the vehicle at the time of installation of the anti-skid tool which is detected by the controller or map information toward the driver of another vehicle different from the vehicle by an output unit, the map information being generated based on the position information of the vehicle and indicating a location at which the anti-skid tool needs to be installed.

According to the aspects of the disclosure, it is possible to accurately determine at which place an anti-skid tool needs to be installed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart illustrating the operation of the driving assistance system according to the second embodiment;

FIG. 4 is a block diagram illustrating the configuration of the driving assistance system according to a third embodiment; and FIG. 5 is a flowchart illustrating the operation of the driving assistance system according to the third embodiment.

DETAILED DESCRIPTION OF EMBODIMENTS

Figure 1:
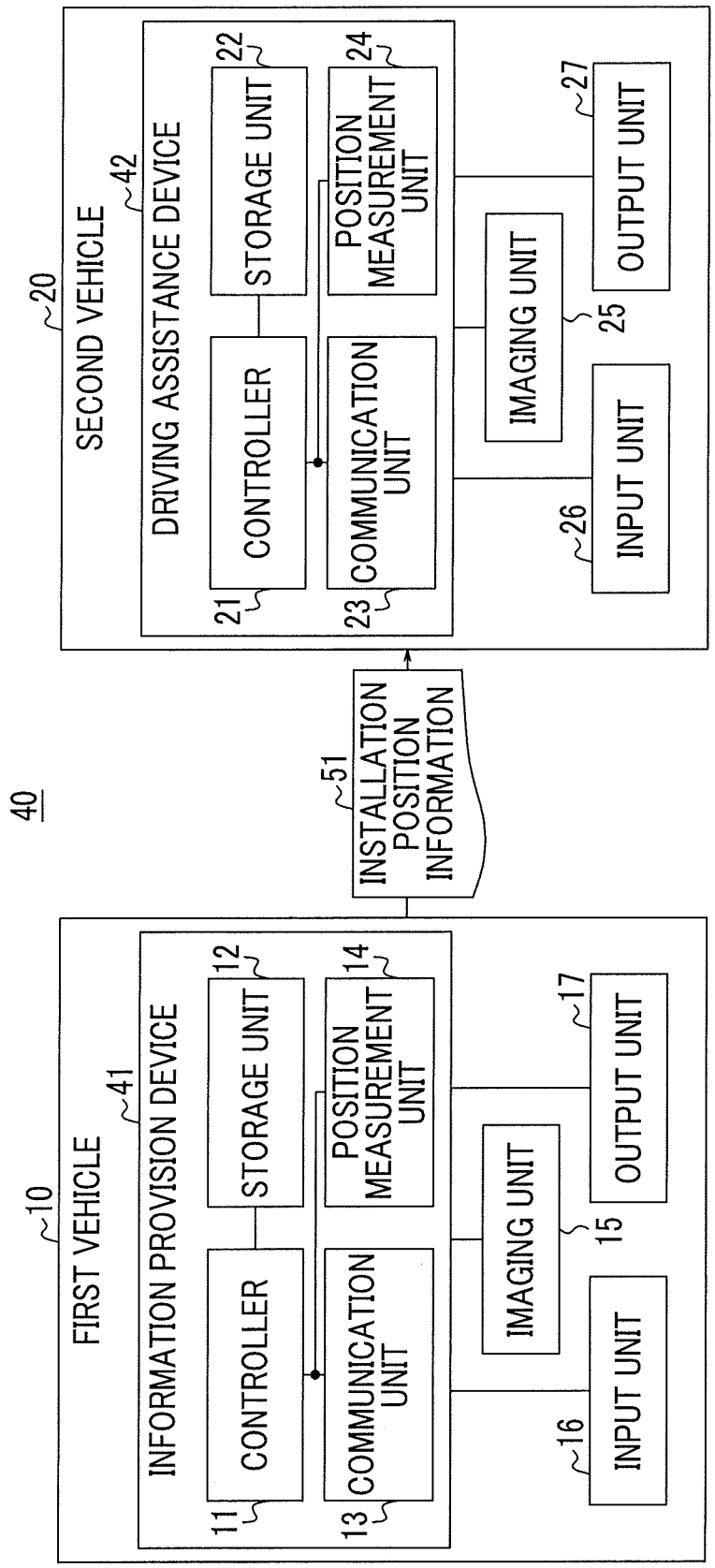
FIG. 1 is a block diagram illustrating the configuration of a driving assistance system according to a first embodiment and a second embodiment.

Hereinafter, embodiments will be described with reference to drawings.

In each drawing, the same or corresponding parts are given the same reference numerals. In description of each embodiment, description of the same or corresponding parts will be appropriately omitted or simplified.

First Embodiment

The outline of an embodiment will be described with reference to FIG. 1.

An imaging unit 15 of a first vehicle 10 captures an image including at least a part of the first vehicle 10 and at least a part of the vicinity of the first vehicle 10. A controller 11 of the first vehicle 10 detects installation of an anti-skid tool onto the first vehicle 10 from the image captured by the imaging unit 15. An output unit 27 of a second vehicle 20, which is a vehicle different from the first vehicle 10, outputs installation position information 51 toward the driver of the second vehicle 20. The installation position information 51 is position information of the first vehicle 10 at the time of anti-skid tool installation which is detected by the controller 11 of the first vehicle 10.

At a place at which an anti-skid tool such as a chain is installed onto the first vehicle 10, it is necessary to install anti-skid tools onto the other vehicles. The driver of the second vehicle 20 can figure out a place, at which an anti-skid tool has been actually installed onto at least one vehicle, by referring to the installation position information 51 output by the output unit 27. Therefore, according to the present embodiment, it is possible to accurately determine at which place an anti-skid tool needs to be installed.

Both of the first vehicle 10 and the second vehicle 20 may be any vehicles. In the present embodiment, both of the first vehicle 10 and the second vehicle 20 are automobiles. A relationship between the first vehicle 10 and the second vehicle 20 is not limited to an one-to-one relationship and may be any of an one-to-many relationship, a many-to-one relationship, and a many-to-many relationship.

The configuration of a driving assistance system 40 according to the present embodiment will be described with reference to FIG. 1.

The driving assistance system 40 is provided with an information provision device 41 and a driving assistance device 42.

The information provision device 41 is provided in the first vehicle 10. The information provision device 41 may be configured as a vehicle-mounted machine such as a navigation device and may be configured as an electronic machine such as a smartphone that is used while being connected to a vehicle-mounted machine.

The information provision device 41 is provided with constituent elements such as the controller 11, a storage unit 12, a communication unit 13, and a position measurement unit 14.

The controller 11 is one or more processors. As the processor, a general-purpose processor such as a CPU or a dedicated processor specialized for a specific process can be used. The "CPU" is an abbreviation of "central processing unit". One or more dedicated circuits may be included in the controller 11 or one or more dedicated circuits may be substituted for one or more processors in the controller 11. As the dedicated circuit, for example, an FPGA or an ASIC can be used. The "FPGA" is an abbreviation of "field-programmable gate array". The "ASIC" is an abbreviation of "application specific integrated circuit". One or more ECUs may be included in the controller 11. The "ECU" is an abbreviation of "electronic control unit". The controller 11 performs information processing relating to the operation of the information provision device 41 while controlling each part of the first vehicle 10 including the information provision device 41.

The storage unit 12 is one or more memories. As the memory, for example, a semiconductor memory, a magnetic memory, or an optical memory can be used. The memory may function as a main storage device, an auxiliary storage device, or a cache memory. The storage unit 12 stores information used for the operation of the information provision device 41 and information acquired through the operation of the information provision device 41.

The communication unit 13 is one or more communication modules. As the communication module, for example, a communication module conforming to DSRC, LTE, 4G, or 5G can be used. The "DSRC" is an abbreviation of "dedicated short range communications". The "LTE" is an abbreviation of "long term evolution". The "4G" is an abbreviation of "4th generation". The "5G" is an abbreviation of "5th generation". The communication unit 13 receives information used for the operation of the information provision device 41 and transmits information acquired through the operation of the information provision device 41.

The position measurement unit 14 is one or more position measurement modules. As the position measurement module, for example, a position measurement module conforming to the GPS, the QZSS, the GLONASS, or the Galileo can be used. The "GPS" is an abbreviation of "global positioning system". The "QZSS" is an abbreviation of "quasi-zenith satellite system". A satellite in the QZSS is called "quasi-zenith satellite". The "GLONASS" is an abbreviation of "global navigation satellite system". The position measurement unit 14 acquires position information of the first vehicle 10.

The functions of the information provision device 41 are realized when an information provision program according to the present embodiment is executed by a processor included in the controller 11. That is, the functions of the information provision device 41 are realized by means of software. The information provision program is a program causing a computer to perform processes in steps included in the operation of the information provision device 41 such that functions corresponding to the processes in the steps are realized by the computer. That is, the information provision program is a program causing the computer to function as the information provision device 41.

The program can be recorded in a computer-readable recording medium. As the computer-readable recording medium, for example, a magneto recording device, an optical disc, a magneto-optical recording medium, or a semiconductor memory can be used. Distribution of the program is performed, for example, by selling, handing over, or lending a portable recording medium such as a DVD or a CD-ROM with the program recorded therein. The "DVD" is an abbreviation of "digital versatile disc". The "CD-ROM" is an abbreviation of "compact disc read only memory". Distribution of the program may be performed by storing the program in a storage of a server and transferring the program to another computer from the server via a network. The program may be provided as a program product.

The computer temporarily stores, in a memory, the program recorded in the portable recording medium or the program transferred from the server. Then, the computer reads the program stored in the memory with a processor and performs a process in accordance with the read program by means of the processor. The computer may perform a process in accordance with the program by directly reading the program from the portable recording medium. The computer may perform a process in accordance with a received program each time when the program is transferred to the computer from the server. The process may be performed by means of a so-called ASP type service in which no program is transferred from the server to the computer and functions are realized by execution instructions and result acquisition solely. The "ASP" is an abbreviation of "application service provider". The program includes information that is to be provided for a process performed by an electronic computer and is equivalent to a program. For example, data defining a process in the computer, which is not a direct command with respect to the computer, corresponds to the "information equivalent to a program".

A part or all of the functions of the information provision device 41 may be realized by means of the dedicated circuit included in the controller 11. That is, a part or all of the functions of the information provision device 41 may be realized by means of a hardware.

The first vehicle 10 is provided with the imaging unit 15, an input unit 16, and an output unit 17 in addition to the information provision device 41. In the first vehicle 10, the imaging unit 15, the input unit 16, and the output unit 17 may be a part of the information provision device 41.

The imaging unit 15 is one or more vehicle-mounted cameras. As the vehicle-mounted camera, for example, a front camera, a side camera, a rear camera, or an in-vehicle camera can be used. The imaging unit 15 captures an image from the first vehicle 10. That is, the imaging unit 15 captures an image of the outside of the first vehicle 10. The imaging unit 15 also captures an image of the inside of the first vehicle 10 such as an image of a driver's seat, an assistant driver's seat, or a back seat in the first vehicle 10.

The input unit 16 is one or more input interfaces. As the input interface, for example, a physical key, a capacitive key, a pointing device, a touch screen integrally provided with a vehicle-mounted display, or a vehicle-mounted microphone can be used. The input unit 16 receives input of information used for the operation of the information provision device 41 from a user such as the driver of the first vehicle 10.

The output unit 17 is one or more output interfaces. As the output interface, for example, a vehicle-mounted display or a vehicle-mounted speaker can be used. As the vehicle-mounted display, for example, an LCD or an organic EL display can be used. The "LCD" is an abbreviation of "liquid crystal display". The "EL" is an abbreviation of "electro luminescence". The output unit 17 outputs information acquired through the operation of the information provision device 41 toward the user.

The driving assistance device 42 is provided in the second vehicle 20. The driving assistance device 42 may be configured as a vehicle-mounted machine such as a navigation device and may be configured as an electronic machine such as a smartphone that is used while being connected to a vehicle-mounted machine.

The driving assistance device 42 is provided with constituent elements such as a controller 21, a storage unit 22, a communication unit 23, and a position measurement unit 24.

The controller 21 is one or more processors. As the processor, a general-purpose processor such as a CPU or a dedicated processor specialized for a specific process can be used. One or more dedicated circuits may be included in the controller 21 or one or more dedicated circuits may be substituted for one or more processors in the controller 21. As the dedicated circuit, for example, an FPGA or an ASIC can be used. One or more ECUs may be included in the controller 21. The controller 21 performs information processing relating to the operation of the driving assistance device 42 while controlling each part of the second vehicle 20 including the driving assistance device 42.

The storage unit 22 is one or more memories. As the memory, for example, a semiconductor memory, a magnetic memory, or an optical memory can be used. The memory may function as a main storage device, an auxiliary storage device, or a cache memory. The storage unit 22 stores information used for the operation of the driving assistance device 42 and information acquired through the operation of the driving assistance device 42.

The communication unit 23 is one or more communication modules. As the communication module, for example, a communication module conforming to DSRC, LTE, 4G; or 5G can be used. The communication unit 23 receives information used for the operation of the driving assistance device 42 and transmits information acquired through the operation of the driving assistance device 42.

The position measurement unit 24 is one or more position measurement modules. As the position measurement module, for example, a position measurement module conforming to the GPS, the QZSS, the GLONASS, or the Galileo can be used. The position measurement unit 24 acquires position information of the second vehicle 20.

The functions of the driving assistance device 42 are realized when a driving assistance program according to the present embodiment is executed by a processor included in the controller 21. That is, the functions of the driving assistance device 42 are realized by means of software. The driving assistance program is a program causing a computer to perform processes in steps included in the operation of the driving assistance device 42 such that functions corresponding to the processes in the steps are realized by the computer. That is, the driving assistance program is a program causing the computer to function as the driving assistance device 42.

A part or all of the functions of the driving assistance device 42 may be realized by means of the dedicated circuit included in the controller 21. That is, a part or all of the functions of the driving assistance device 42 may be realized by means of a hardware.

The second vehicle 20 is provided with an imaging unit 25, an input unit 26, and the output unit 27 in addition to the driving assistance device 42. In the second vehicle 20, the imaging unit 25, the input unit 26, and the output unit 27 may be a part of the driving assistance device 42.

The imaging unit 25 is one or more vehicle-mounted cameras. As the vehicle-mounted camera, for example, a front camera, a side camera, a rear camera, or an in-vehicle camera can be used. The imaging unit 25 captures an image from the second vehicle 20. That is, the imaging unit 25 captures an image of the outside of the second vehicle 20. The imaging unit 25 also captures an image of the inside of the second vehicle 20 such as an image of a driver's seat, an assistant driver's seat, or a back seat in the second vehicle 20.

The input unit 26 is one or more input interfaces. As the input interface, for example, a physical key, a capacitive key, a pointing device, a touch screen integrally provided with a vehicle-mounted display, or a vehicle-mounted microphone can be used. The input unit 26 receives input of information used for the operation of the driving assistance device 42 from a user such as the driver of the second vehicle 20.

The output unit 27 is one or more output interfaces. As the output interface, for example, a vehicle-mounted display or a vehicle-mounted speaker can be used. As the vehicle-mounted display, for example, an LCD or an organic EL display can be used. The output unit 27 outputs information acquired through the operation of the driving assistance device 42 toward the user.

The operation of the driving assistance system 40 according to the present embodiment will be described with reference to FIG. 2 in addition to FIG. 1. The operation of the driving assistance system 40 corresponds to a driving assistance method according to the present embodiment.

The processes in step S101 to step S103 are performed in the first vehicle 10.

In step S101, the controller 11 of the information provision device 41 acquires an image including at least a part of the first vehicle 10 and at least a part of the vicinity of the first vehicle 10 and position information of the first vehicle 10.

Specifically, the controller 11 acquires, from the imaging unit 15, at least any of an image of the inside of the first vehicle 10 such as an image of the driver's seat, the assistant driver's seat, or the back seat in the first vehicle 10 and an image of the vicinity of the first vehicle 10 such as an image of a front side, a lateral side, or a rear side of the first vehicle 10. The image of the inside of the first vehicle 10 corresponds to the image including at least a part of the first vehicle 10. The image of the vicinity of the first vehicle 10 corresponds to the image including at least a part of the vicinity of the first vehicle 10. In the present embodiment, the controller 11 acquires both of the image of the inside of the first vehicle 10 and the image of the vicinity of the first vehicle 10 from the imaging unit 15. The images may be moving images and may be still images. The controller 11 acquires position information of the first vehicle 10 at a current time from the position measurement unit 14. The position information is, for example, two-dimensional coordinates or three-dimensional coordinates representing the current position of the first vehicle 10 which are acquired by using the GPS, the QZSS, the GLONASS, the Galileo, or a combination of two or more of the GPS, the QZSS, the GLONASS, and the Galileo. The controller 11 stores the image acquired from the imaging unit 15 into the storage unit 12 and stores time information indicating a current time and position information acquired from the position measurement unit 14 into the storage unit 12 such that the time information and the position information are associated with the image.

The controller 11 may acquire, from the imaging unit 15, time information indicating a time at which the image has been captured along with the image. In this case, the controller 11 acquires, from the position measurement unit 14, position information of the first vehicle 10 at the time indicated by the acquired time information. The controller 11 stores the acquired image into the storage unit 12 and stores the acquired time information and position information into the storage unit 12 such that the time information and the position information are associated with the image.

In step S102, the controller 11 detects installation of an anti-skid tool onto the first vehicle 10 from the image acquired in step S101.

Specifically, the controller 11 recognizes an action of a person in at least any of the inside of the first vehicle 10 and the vicinity of the first vehicle 10 from the image stored into the storage unit 12 in step S101. In the present embodiment, the controller 11 analyzes the image of the inside of the first vehicle 10 to recognize an action of a person in the inside of the first vehicle 10 and analyzes the image of the vicinity of the first vehicle 10 to recognize an action of a person in the vicinity of the first vehicle 10. Then, the controller 11 determines whether the recognized action is an action of installing an anti-skid tool or not in order to detect installation of an anti-skid tool onto the first vehicle 10. As a technique of recognizing an action of a person in an image, for example, an image recognizing technique which uses machine learning can be used.

Even in a case where an action at the time of installation of an anti-skid tool is not shown in the image stored in the storage unit 12 in step S101 the controller 11 may detect installation of an anti-skid tool onto the first vehicle 10 based on an action before or after the time of installation. For example, it will be assumed that a tire of the first vehicle 10 is on the outside of an imaging range of a side camera included in the imaging unit 15 such that the tire is not shown in an image of a lateral side of the first vehicle 10. In this case, the controller 11 may detect installation of an anti-skid tool onto the tire of the first vehicle 10 based on a series of actions recognized in a stepwise manner as follow.

For example, in a first step, the controller 11 analyzes at least any of an image of the driver's seat of the first vehicle 10 and an image of a lateral side of the first vehicle 10 to recognize an action of opening a door of the first vehicle 10 and getting off the first vehicle 10 which is performed by the driver of the first vehicle 10. In a second step, the controller 11 analyzes an image of the rear side of the first vehicle 10 to recognize an action of extracting an anti-skid tool from a trunk of the first vehicle 10 which is performed by the driver of the first vehicle 10. In a third step, the controller 11 analyzes an image of a lateral side of the first vehicle 10 to recognize an action of crouching with the anti-skid tool which is performed by the driver of the first vehicle 10. In a fourth step, the controller 11 analyzes an image of the lateral side of the first vehicle 10 to recognize an action of standing up without the anti-skid tool which is performed by the driver of the first vehicle 10. In a fifth step, the controller 11 analyzes any of an image of the driver's seat of the first vehicle 10 and an image of the lateral side of the first vehicle 10 to recognize an action of opening a door of the first vehicle 10 and getting on the first vehicle 10 which is performed by the driver of the first vehicle 10. In this step, the controller 11 presumes that the series of recognized actions is an action of installing the anti-skid tool.

Furthermore, the controller 11 may confirm whether the anti-skid tool has been installed or not with the driver of the first vehicle 10 via the output unit 17. In addition, the controller 11 may receive a reply from the driver of the first vehicle 10 via the input unit 16. In a case where a replay indicating that there is no anti-skid tool installed is received, the controller 11 regards a presumption that the series of recognized actions is an action of installing the anti-skid tool as a wrong presumption and cancels the presumption. Therefore, erroneous detection of installation of an anti-skid tool can be avoided. The confirmation about whether an anti-skid tool has been installed and a reply thereto may be made by means of a button displayed on a touch screen and an action of pressing the button and may be made by means of a voice.

The controller 11 may presume that the series of recognized actions is an action of installing the anti-skid tool after the first vehicle 10 starts to travel after the fifth step.

Furthermore, the controller 11 may determine the degree of slip of the first vehicle 10 based on information acquired from various sensors of the first vehicle 10 after the first vehicle 10 starts to travel. Then, the controller 11 may compare the result of the determination with the degree of slip that is determined in the same manner at the time of previous travel of the first vehicle 10. In a case where there is no decrease in degree of slip, the controller 11 regards a presumption that the series of recognized actions is an action of installing the anti-skid tool as a wrong presumption and cancels the presumption. Therefore, erroneous detection of installation of an anti-skid tool can be avoided.

The first step, the second step, and the fifth step may be omitted from among the first to fifth steps. Another step may be added and one or more steps may be substituted for other steps.

The controller 11 may not perform a process of recognizing an action of a person in an image while the first vehicle 10 is traveling.

In a case where a tire of the first vehicle 10 is shown in the image stored in the storage unit 12 in step S101, the controller 11 may recognize the tire of the first vehicle 10 from the image. In this case, the controller 11 determines whether the recognized tire has been installed or not to detect installation of an anti-skid tool.

In a case where installation of an anti-skid tool onto the first vehicle 10 is not detected from the image acquired in step S101, the controller 11 may delete the image and time information and position information corresponding to the image from the storage unit 12.

The processes in step S101 and step S102 are repeatedly performed until installation of an anti-skid tool onto the first vehicle 10 is detected by the controller 11. In a case where installation of an anti-skid tool onto the first vehicle 10 is detected by the controller 11, a process in step S103 is performed.

In step S103, the communication unit 13 of the information provision device 41 provides, as the installation position information 51, position information of the first vehicle 10 at the time of the installation of an anti-skid tool which is detected by the controller 11 in step S102.

Specifically, the controller 11 inputs the latest time information stored in the storage unit 12 in step S101 and the installation position information 51, which is the latest position information stored in the storage unit 12 in step S101, to the communication unit 13. The communication unit 13 transmits, to the driving assistance device 42 of the second vehicle 20, the time information and the installation position information 51 input from the controller 11 through inter-vehicle communication, road-vehicle communication, and communication made via a network.

The communication unit 13 may provide the installation position information 51 via a server belonging to a cloud computing system or another computing system.

The processes in step S104 to step S107 are performed in the second vehicle 20.

In step S104, the communication unit 23 of the driving assistance device 42 acquires the installation position information 51 provided from the information provision device 41 of the first vehicle 10 in step S103.

Specifically, the communication unit 23 receives the time information and the installation position information 51 transmitted from the information provision device 41 of the first vehicle 10 in step S103 through inter-vehicle communication, road-vehicle communication, and communication made via a network. The controller 21 acquires, from the communication unit 23, the time information and the installation position information 51 received by the communication unit 23. The controller 21 stores the acquired time information and the installation position information 51 into the storage unit 22.

In step S105, the controller 21 of the driving assistance device 42 acquires position information of the second vehicle 20.

Specifically, the controller 21 acquires position information of the second vehicle 20 at a current time from the position measurement unit 24. The position information is, for example, two-dimensional coordinates or three-dimensional coordinates representing the current position of the second vehicle 20 which are acquired by using the GPS, the QZSS, the GLONASS, the Galileo, or a combination of two or more of the GPS, the QZSS, the GLONASS, and the Galileo. The controller 21 stores the acquired position information into the storage unit 22.

In step S106, the controller 21 determines whether the driver of the second vehicle 20 is driving toward a position indicated by the installation position information 51 which is acquired by the communication unit 23 in step S104 or not. That is, the controller 21 determines whether the second vehicle 20 is approaching the position indicated by the installation position information 51 or not.

Specifically, the controller 21 calculates a distance between the current position of the second vehicle 20 and the position indicated by the installation position information 51 stored in the storage unit 22 in step S104, the current position of the second vehicle 20 being indicated by the position information stored in the storage unit 22 in step S105. The controller 21 compares the calculated distance with a threshold value. The threshold value may be a fixed value such as 1 kilometer, may be a value dynamically obtained corresponding to the speed limit of a road on which the second vehicle 20 is traveling, and may be a value dynamically obtained corresponding to the speed of the second vehicle 20. In a case where the threshold value is a fixed value, the threshold value may be a value selected corresponding to the type of a road on which the second vehicle 20 is traveling such that the threshold value becomes 1 kilometer when the second vehicle 20 is traveling on a general road and the threshold value becomes 3 kilometers when the second vehicle 20 is traveling on a highway. In a case where the calculated distance is greater than the threshold value, the controller 21 determines that the second vehicle 20 is not approaching the position indicated by the installation position information 51. In a case where the calculated distance is smaller than the threshold value, the controller 21 determines that the second vehicle 20 is approaching the position indicated by the installation position information 51, that is, the driver of the second vehicle 20 is driving toward the position indicated by the installation position information 51.

The installation position information 51 may include information indicating the proceeding direction of the first vehicle 10 at the time of detection of installation of an anti-skid tool onto the first vehicle 10. In this case, the controller 21 determines the proceeding direction of the second vehicle 20 corresponding to a change in position indicated by the position information acquired in step S105. In a case where the calculated distance is smaller than the threshold value and the determined proceeding direction is the same as the proceeding direction indicated by the installation position information 51, the controller 21 determines that the second vehicle 20 is approaching the position indicated by the installation position information 51.

The processes in step S105 and step S106 are repeatedly performed until the controller 21 determines that the second vehicle 20 is approaching the position indicated by the installation position information 51. In a case where the controller 21 determines that the second vehicle 20 is approaching the position indicated by the installation position information 51, a process in step S107 is performed.

In step S107, the controller 21 presents the installation position information 51 acquired by the communication unit 23 in step S104 to the driver of the second vehicle 20. The controller 21 uses the output unit 27 as means for presenting the installation position information 51. That is, the output unit 27 is controlled by the controller 21 such that the output unit 27 outputs the installation position information 51 toward the driver of the second vehicle 20.

Specifically, the controller 21 inputs, to the output unit 27, the time information and the installation position information 51 stored into the storage unit 22 in step S104. The output unit 27 displays a screen including the time information and the installation position information 51 input from the controller 21. On this screen, the time information is displayed in the form of a text such as "at 10:00 today" or "30 minutes ago". On the same screen, the installation position information 51 is displayed in the form of a text such as "there is a vehicle onto which an anti-skid tool has been installed 1 km ahead" along with the time information. The installation position information 51 may be displayed such that a figure such as an anti-skid tool icon is disposed on a corresponding position in a map. A figure such as an automobile icon may be displayed on the current position of the second vehicle 20 in the map. The amount of information on the screen is appropriately adjusted such that safe driving is not interfered with. For example, the time information may not be displayed. Alternatively, the time information and the installation position information 51 may be output as a voice.

The processes in step S105 and step S106 may be omitted. That is, the process in step S107 may be performed regardless of the position of the second vehicle 20.

The processes in step S101 to step S103 may be performed in two or more vehicles corresponding to the first vehicle 10. The process in step S104 may be performed in the second vehicle 20 for each of the two or more vehicles. That is, in step S104, the installation position information 51 may be acquired from two or more vehicles. In the present embodiment, the process in step S107 is performed in the second vehicle 20 when the installation position information 51 is acquired from at least one vehicle. However, a case where the process in step S107 is performed in the second vehicle 20 may be limited to a case where the installation position information 51 indicating the substantially same position is acquired from vehicles of a designated number or more. In this case, the reliability of the output installation position information 51 is improved.

As described above, the controller 11 of the information provision device 41 detects installation of an anti-skid tool onto the first vehicle 10 from an image including at least a part of the first vehicle 10 and at least a part of the vicinity of the first vehicle 10. The communication unit 13 of the information provision device 41 provides the installation position information 51 which is position information of the first vehicle 10 at the time of the anti-skid tool installation which is detected by the controller 11. The communication unit 23 of the driving assistance device 42 acquires the installation position information 51, which is the position information of the first vehicle 10 at the time of installation of an anti-skid tool, in a case where the installation of the anti-skid tool onto the first vehicle 10 is detected from the image including at least a part of the first vehicle 10 and at least a part of the vicinity of the first vehicle 10. The controller 21 of the driving assistance device 42 presents the installation position information 51 acquired by the communication unit 23 to the driver of the second vehicle 20. Therefore, according to the present embodiment, it is possible to accurately determine at which place an anti-skid tool needs to be installed.

The controller 11 of the information provision device 41 recognizes an action of a person in at least any of the inside of the first vehicle 10 and the vicinity of the first vehicle 10 from the image including at least a part of the first vehicle 10 and a part of the vicinity of the first vehicle 10. The controller 11 determines whether the recognized action is an action of installing an anti-skid tool onto the first vehicle 10 or not to detect installation of an anti-skid tool. Therefore, according to the present embodiment, it is possible to detect installation of an anti-skid tool even in a case where an anti-skid tool at the time of installation onto the first vehicle 10 or an anti-skid tool in a state of being installed onto the first vehicle 10 is not shown in the image.

The information provision device 41 may be configured as a server belonging to a cloud computing system or another computing system. In this case, the processes in step S102 and step S103 are performed in the server. Each time the process in step S101 is performed in the first vehicle 10, information needed in the processes in step S102 and step S103 such as the image and the position information acquired in step S101 is uploaded to the server from the first vehicle 10. In step S103, information needed in the processes in step S104 to step S107 such as the installation position information 51 is transmitted to the server from the second vehicle 20.

Second Embodiment

The outline of an embodiment will be described with reference to FIG. 1.

In the present embodiment, installation of an anti-skid tool onto a third vehicle is detected from an image including at least a part of the third vehicle. That is, the imaging unit 15 of the first vehicle 10, which is a vehicle different from the third vehicle, captures the image including at least a part of the third vehicle from the first vehicle 10. The controller 11 of the first vehicle 10 detects installation of an anti-skid tool onto the third vehicle from the image captured by the imaging unit 15. The output unit 27 of the second vehicle 20 outputs the installation position information 51 toward the driver of the second vehicle 20. The installation position information 51 is position information of the third vehicle at the time of the anti-skid tool installation which is detected by the controller 11 of the first vehicle 10.

At a place at which an anti-skid tool such as a chain is installed onto the third vehicle, it is necessary to install anti-skid tools onto the other vehicles. The driver of the second vehicle 20 can figure out a place, at which an anti-skid tool has been actually installed onto at least one vehicle, by referring to the installation position information 51 output by the output unit 27. Therefore, according to the present embodiment, it is possible to accurately determine at which place an anti-skid tool needs to be installed.

The third vehicle may be any vehicle. In the present embodiment, the third vehicle is an automobile. A relationship between the first vehicle 10 and the third vehicle is not limited to an one-to-one relationship and may be any of an one-to-many relationship, a many-to-one relationship, and a many-to-many relationship.

Figure 2:
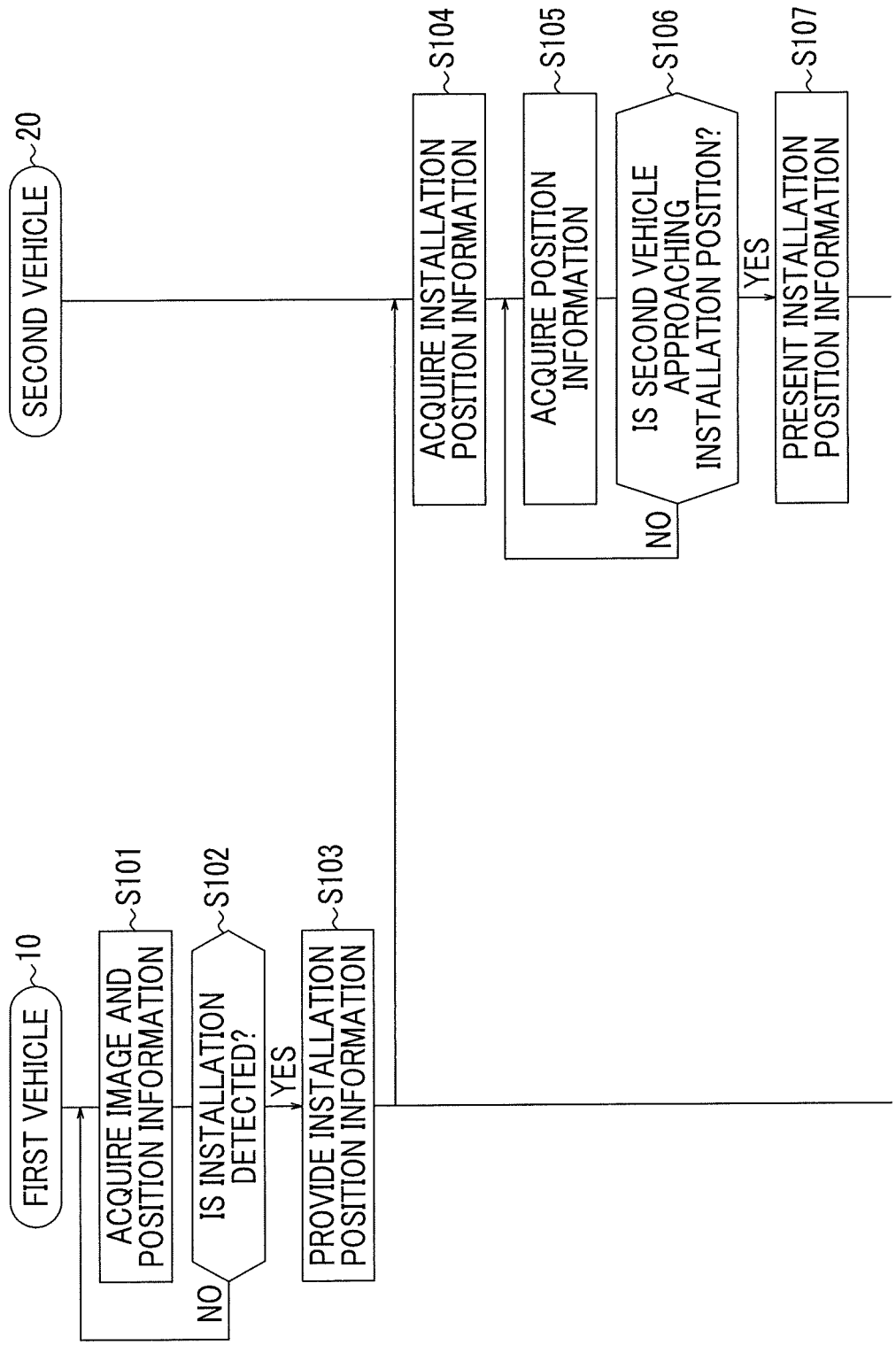
FIG. 2 is a flowchart illustrating the operation of the driving assistance system according to the first embodiment.

Since the configuration of the driving assistance system 40 according to the present embodiment is the same as that in the first embodiment shown in FIG. 1, the description thereof will be omitted.

The operation of the driving assistance system 40 according to the present embodiment will be described with reference to FIG. 3 in addition to FIG. 1. The description about the same part as the first embodiment will be appropriately omitted or simplified. The operation of the driving assistance system 40 corresponds to a driving assistance method according to the present embodiment.

The processes in step S201 to step S204 are performed in the first vehicle 10.

In step S201, the controller 11 of the information provision device 41 acquires an image captured from the first vehicle 10 and position information of the first vehicle 10.

Specifically, the controller 11 acquires, from the imaging unit 15, an image of the outside of the first vehicle 10 such as an image of a front side, a lateral side, or a rear side of the first vehicle 10. This image may be a moving image and may be a still image. The controller 11 acquires position information of the first vehicle 10 at a current time from the position measurement unit 14. The controller 11 stores the image acquired from the imaging unit 15 into the storage unit 12 and stores time information indicating a current time and position information acquired from the position measurement unit 14 into the storage unit 12 such that the time information and the position information are associated with the image.

In step S202, the controller 11 detects installation of an anti-skid tool onto the third vehicle from the image acquired in step S201.

Specifically, the controller 11 recognizes a tire of the third vehicle from the image stored into the storage unit 12 in step S201. In the present embodiment, the controller 11 analyzes the image of the outside of the first vehicle 10 to determine whether a part of the third vehicle including at least a tire is shown in the image or not and in a case where a part of the third vehicle including at least the tire is shown in the image, the controller 11 determines whether an anti-skid tool has been installed onto the tire or not to detect installation of an anti-skid tool onto the third vehicle. As a technique of recognizing a vehicle, a tire of the vehicle, and an anti-skid tool installed onto the tire in an image, for example, an image recognizing technique which uses machine learning can be used.

The controller 11 may recognize an action of a person in the vicinity of the third vehicle from the image stored into the storage unit 12 in step S201. In this case, the controller 11 analyzes the image stored into the storage unit 12 in step S201 to determine whether there is a person in the vicinity of the third vehicle in the image or not and in a case where there is a person in the vicinity of the third vehicle in the image, the controller 11 determines whether an action of the person is an action of installing an anti-skid tool onto the third vehicle or not to detect installation of an anti-skid tool onto the third vehicle. As a technique of recognizing an action of a person in an image, for example, an image recognizing technique which uses machine learning can be used.

In a case where installation of an anti-skid tool onto the third vehicle is not detected from the image acquired in step S201, the controller 11 may delete the image and time information and position information corresponding to the image from the storage unit 12.

The processes in step S201 and step S202 are repeatedly performed until installation of an anti-skid tool onto the third vehicle is detected by the controller 11. In a case where installation of an anti-skid tool is detected by the controller 11, processes in step S203 and subsequent steps are performed.

In step S203, the controller 11 estimates position information of the third vehicle, which the communication unit 13 provides as the installation position information 51, from position information of the first vehicle 10 at the time of the installation of an anti-skid tool which is detected in step S202.

Specifically, the controller 11 further analyzes the image stored into the storage unit 12 in step S201 to calculate a distance from the first vehicle 10 and the third vehicle and a relative direction. The controller 11 calculates an estimate of the position of the third vehicle at the time of the anti-skid tool installation detected in step S202 from the calculated distance and relative direction and the position of the first vehicle 10 indicated by the position information stored into the storage unit 12 in step S201.

The controller 11 may acquire position information of the third vehicle from the third vehicle instead of estimating the position information of the third vehicle from the position information of the first vehicle 10. In this case, the communication unit 13 transmits a request for position information to the third vehicle through inter-vehicle communication, road-vehicle communication, and communication made via a network. Then, the communication unit 13 receives, through inter-vehicle communication, road-vehicle communication, and communication made via a network, position information of the third vehicle that is transmitted from the third vehicle as a reply to the request. The controller 11 acquires, from the communication unit 13, the position information received by the communication unit 13.

In step S204, the communication unit 13 of the information provision device 41 provides, as the installation position information 51, the position information of the third vehicle estimated by the controller 11 in step S203.

Specifically, the controller 11 inputs the latest time information stored in the storage unit 12 in step S101 and the installation position information 51, which is an estimate of the position of the third vehicle calculated in step S203, to the communication unit 13. The communication unit 13 transmits, to the driving assistance device 42 of the second vehicle 20, the time information and the installation position information 51 input from the controller 11 through inter-vehicle communication, road-vehicle communication, and communication made via a network.

The processes in step S205 to step S208 are performed in the second vehicle 20.

The processes in step S205 to step S208 are the same as the processes in step S104 to step S107 and thus description thereof will be omitted.

The installation position information 51 may include information indicating the proceeding direction of the third vehicle at the time of detection of installation of an anti-skid tool onto the third vehicle. In this case, in step S207, the controller 21 of the driving assistance device 42 determines the proceeding direction of the second vehicle 20 corresponding to a change in position indicated by the position information acquired in step S206. In a case where the calculated distance is smaller than the threshold value and the determined proceeding direction is the same as the proceeding direction indicated by the installation position information 51, the controller 21 determines that the second vehicle 20 is approaching the position indicated by the installation position information 51. The proceeding direction of the third vehicle can be estimated by recognizing the orientation of the third vehicle in the image in step S203, for example.

As described above, in the present embodiment, the controller 11 of the information provision device 41 detects installation of an anti-skid tool onto the third vehicle from an image including at least a part of the third vehicle which is captured from the first vehicle 10. The communication unit 13 of the information provision device 41 provides the installation position information 51 which is position information of the third vehicle at the time of the anti-skid tool installation which is detected by the controller 11. The communication unit 23 of the driving assistance device 42 acquires the installation position information 51, which is the position information of the third vehicle at the time of installation of an anti-skid tool, in a case where an image including at least a part of the third vehicle is captured from the first vehicle 10 and the installation of the anti-skid tool onto the third vehicle is detected from the image. The controller 21 of the driving assistance device 42 presents the installation position information 51 acquired by the communication unit 23 to the driver of the second vehicle 20. Therefore, according to the present embodiment, it is possible to accurately determine at which place an anti-skid tool needs to be installed.

The controller 11 of the information provision device 41 recognizes a tire of the third vehicle from the image including at least a part of the third vehicle. The controller 11 determines whether an anti-skid tool has been installed onto the recognized tire or not in order to detect installation of an anti-skid tool. Therefore, according to the present embodiment, it is possible to almost certainly detect installation of an anti-skid tool in a case where an anti-skid tool at the time of installation onto the third vehicle or an anti-skid tool in a state of being installed onto the third vehicle is shown in the image.

The controller 11 of the information provision device 41 estimates position information of the third vehicle, which the communication unit 13 provides as the installation position information 51, from position information of the first vehicle 10 in a case where an image including at least a part of the third vehicle is captured from the first vehicle 10. Therefore, according to the present embodiment, it is not necessary to acquire position information of the third vehicle at the time of installation of an anti-skid tool from the third vehicle in a case where the installation of the anti-skid tool onto the third vehicle is detected.

Third Embodiment

The outline of an embodiment will be described with reference to FIG. 4.

In the first embodiment, the output unit 27 of the second vehicle 20 outputs the installation position information 51 toward the driver of the second vehicle 20. The installation position information 51 is position information of the first vehicle 10 at the time of anti-skid tool installation which is detected by the controller 11 of the first vehicle 10. However, in the present embodiment, the output unit 27 of the second vehicle 20 outputs map information 52 toward the driver of the second vehicle 20, the map information 52 being generated based on the installation position information 51 and indicating a location at which an anti-skid tool needs to be installed.

As with the first embodiment, at a place at which an anti-skid tool such as a chain is installed on the first vehicle 10, it is necessary to install anti-skid tools onto the other vehicles. The driver of the second vehicle 20 can accurately determine at which place an anti-skid tool needs to be installed by referring to the map information 52 output by the output unit 27.

A relationship between the first vehicle 10 and the second vehicle 20 may be an one-to-one relationship or an one-to-many relationship. In the present embodiment, the relationship between the first vehicle 10 and the second vehicle 20 is a many-to-one relationship or a many-to-many relationship.

The configuration of the driving assistance system 40 according to the present embodiment will be described with reference to FIG. 4. The description about the same part as the first embodiment will be appropriately omitted or simplified.

The driving assistance system 40 is provided with the information provision device 41, the driving assistance device 42, and a map generation device 43.

The information provision device 41 and the map generation device 43 can communicate with each other via a network 44 such as a mobile communication network and the Internet. The driving assistance device 42 and the map generation device 43 also can communicate with each other via the network 44.

As with the first embodiment, the information provision device 41 is provided in the first vehicle 10.

As with the first embodiment, the first vehicle 10 is provided with the imaging unit 15, the input unit 16, and the output unit 17 in addition to the information provision device 41.

As with the first embodiment, the driving assistance device 42 is provided in the second vehicle 20.

As with the first embodiment, the second vehicle 20 is provided with the imaging unit 25, the input unit 26, and the output unit 27 in addition to the driving assistance device 42.

The map generation device 43 may be provided at any place. In the present embodiment, the map generation device 43 is provided in a data center. The map generation device 43 may be configured as a server 30 belonging to a cloud computing system or another computing system.

The map generation device 43 is provided with constituent elements such as a controller 31, a storage unit 32, and a communication unit 33.

The controller 31 is one or more processors. As the processor, a general-purpose processor such as a CPU or a dedicated processor specialized for a specific process can be used. One or more dedicated circuits may be included in the controller 31 or one or more dedicated circuits may be substituted for one or more processors in the controller 31. As the dedicated circuit, for example, an FPGA or an ASIC can be used. The controller 31 performs information processing relating to the operation of the map generation device 43 while controlling each part of the server 30, which is the map generation device 43.

The storage unit 32 is one or more memories. As the memory, for example, a semiconductor memory, a magnetic memory, or an optical memory can be used. The memory may function as a main storage device, an auxiliary storage device, or a cache memory. The storage unit 32 stores information used for the operation of the map generation device 43 and information acquired through the operation of the map generation device 43.

The communication unit 33 is one or more communication modules. As the communication module, for example, a communication module conforming to a LAN standard can be used. The "LAN" is an abbreviation of "local area network". The communication unit 33 receives information used for the operation of the map generation device 43 and transmits information acquired through the operation of the map generation device 43.

The functions of the map generation device 43 are realized when a map generation program according to the present embodiment is executed by a processor included in the controller 31. That is, the functions of the map generation device 43 are realized by means of software. The map generation program is a program causing a computer to perform processes in steps included in the operation of the map generation device 43 such that functions corresponding to the processes in the steps are realized by the computer.

That is, the map generation program is a program causing the computer to function as the map generation device 43.

A part or all of the functions of the map generation device 43 may be realized by means of the dedicated circuit included in the controller 31. That is, a part or all of the functions of the map generation device 43 may be realized by means of a hardware.

The operation of the driving assistance system 40 according to the present embodiment will be described with reference to FIG. 5 in addition to FIG. 4. The description about the same part as the first embodiment will be appropriately omitted or simplified. The operation of the driving assistance system 40 corresponds to a driving assistance method according to the present embodiment.

The processes in step S301 to step S303 are performed in the first vehicle 10.

The processes in step S301 and step S302 are the same as the processes in step S101 and step S102 and thus description thereof will be omitted.

In step S303, the communication unit 13 of the information provision device 41 provides, as the installation position information 51, position information of the first vehicle 10 at the time of installation of an anti-skid tool which is detected by the controller 11 in step S302.

Specifically, the controller 11 inputs the latest time information stored in the storage unit 12 in step S301 and the installation position information 51, which is the latest position information stored in the storage unit 12 in step S301, to the communication unit 13. The communication unit 13 transmits, to the map generation device 43 which is the server 30, the time information and the installation position information 51 input from the controller 11 via the network 44.

The processes in step S301 to step S303 are performed in two or more vehicles corresponding to the first vehicle 10. The processes in step S304 to step S306 are performed in the server 30 for each of the two or more vehicles.

In step S304, the communication unit 33 of the map generation device 43 acquires the installation position information 51 provided from the information provision device 41 of the first vehicle 10 in step S303.

Specifically, the communication unit 33 receives the time information and the installation position information 51 transmitted from the information provision device 41 of the first vehicle 10 in step S303 via the network 44. The controller 31 acquires, from the communication unit 33, the time information and the installation position information 51 received by the communication unit 33. The controller 31 stores the acquired time information and the installation position information 51 into the storage unit 32.

In a case where the installation position information 51 is transmitted from the information provision device 41 of the first vehicle 10 in almost real time, the controller 31 may store, as the time information, information indicating a time at which the installation position information 51 of the communication unit 33 is received from the information provision device 41 of the first vehicle 10, into the storage unit 32. In this case, the communication unit 33 may not receive time information from the information provision device 41 of the first vehicle 10.

In step S305, the controller 31 of the map generation device 43 generates, based on the installation position information 51 which is acquired by the communication unit 33 in step S304, the map information 52 indicating a location at which an anti-skid tool needs to be installed.

Specifically, in a case where a time indicated by the time information stored into the storage unit 32 in step S304 is within a designated time period (several hours or one day) from a current time, the controller 31 selects a position indicated by the installation position information 51 stored into the storage unit 32 in step S304, for each of two or more vehicles corresponding to the first vehicle 10. In a case where there is a position selected in relation to one or more vehicles, the controller 31 generates the map information 52 collectively indicating the selected position as a location at which an anti-skid tool needs to be installed. That is, the controller 31 generates the map information 52 that collectively indicates a position indicated by the installation position information 51 acquired from one or more vehicles within the latest designated time period as a location at which an anti-skid tool needs to be installed.

In the present embodiment, in a case where there is a position selected in relation to at least one vehicle, the position is reflected on the map information 52 as a location at which an anti-skid tool needs to be installed. However, a case where a selected position is reflected on the map information 52 as a location at which an anti-skid tool needs to be installed may be limited to a case where positions that are substantially the same as each other are selected in relation to vehicles of a designated number or more. In this case, the reliability of the map information 52 is improved.

In step S306, the communication unit 33 provides the map information 52 generated by the controller 31 in step S305.

Specifically, the controller 31 inputs, to the communication unit 33, the map information 52 generated in step S305. The communication unit 33 transmits, to the driving assistance device 42 of the second vehicle 20, the map information 52 input from the controller 31 via the network 44.

The processes in step S305 and step S306 are performed each time the process in step S304 is performed, that is, each time the installation position information 51 is acquired. Alternatively, the processes in step S305 and step S306 are performed for each time a unit period time such as a period of several minutes, a period of several tens of minutes, or a period of one hour elapses. When the process in step S305 is performed again after the map information 52 is generated once in step S305, the generated map information 52 is updated with no map information 52 being generated newly. A position indicated by old installation position information 51 acquired before the latest designated time period is removed from the map information 52.

The processes in step S307 and step S308 are performed in the second vehicle 20 each time the map information 52 is provided from the map generation device 43, which is the server 30.

In step S307, the communication unit 23 of the driving assistance device 42 acquires the map information 52 provided from the map generation device 43, which is the server 30, in step S306.

Specifically, the communication unit 23 receives the map information 52 transmitted from the map generation device 43, which is the server 30, in step S306 via the network 44. The controller 21 acquires, from the communication unit 23, the map information 52 received by the communication unit 23. The controller 21 stores the map information 52 in the storage unit 22.

In step S308, the controller 21 of the driving assistance device 42 presents the map information 52 acquired by the communication unit 23 in step S307 to the driver of the second vehicle 20. The controller 21 uses the output unit 27 as means for presenting the map information 52. That is, the output unit 27 is controlled by the controller 21 such that the output unit 27 outputs the map information 52 toward the driver of the second vehicle 20.

Specifically, the controller 21 inputs, to the output unit 27, the map information 52 stored into the storage unit 22 in step S307. The output unit 27 displays a screen including the map information 52 input from the controller 21. In this screen, the map information 52 is displayed such that a figure such as an anti-skid tool icon disposed on a location on a map at which an anti-skid tool needs to be installed. A figure such as an automobile icon may be displayed on the current position of the second vehicle 20 in the map as well. The amount of information in the screen is appropriately adjusted such that safe driving is not interfered with.

As described above, the controller 11 of the information provision device 41 detects installation of an anti-skid tool onto the first vehicle 10 from an image including at least a part of the first vehicle 10 and at least a part of the vicinity of the first vehicle 10. The communication unit 13 of the information provision device 41 provides the installation position information 51 which is position information of the first vehicle 10 at the time of anti-skid tool installation which is detected by the controller 11. The communication unit 33 of the map generation device 43 acquires the installation position information 51, which is the position information of the first vehicle 10 at the time of installation of an anti-skid tool, in a case where the installation of the anti-skid tool onto the first vehicle 10 is detected from the image including at least a part of the first vehicle 10 and at least a part of the vicinity of the first vehicle 10. The controller 31 of the map generation device 43 generates, based on the installation position information 51 which is acquired by the communication unit 13, the map information 52 indicating a location at which an anti-skid tool needs to be installed. The communication unit 23 of the driving assistance device 42 acquires the map information 52 in a case where the installation of the anti-skid tool onto the first vehicle 10 is detected from the image including at least a part of the first vehicle 10 and at least a part of the vicinity of the first vehicle 10, the map information 52 being generated based on the installation position information 51, which is the position information of the first vehicle 10 at the time of the detected anti-skid tool installation, and indicating a location at which an anti-skid tool needs to be installed. The controller 21 of the driving assistance device 42 presents the map information 52 acquired by the communication unit 23 to the driver of the second vehicle 20. Therefore, according to the present embodiment, it is possible to accurately determine at which place an anti-skid tool needs to be installed.

The information provision device 41 may be configured as a part of the server 30. In this case, the processes in step S302 and step S303 are performed in server 30. Each time the process in step S301 is performed in the first vehicle 10, information needed in the processes in step S302 and step S303 such as the image and the position information acquired in step S301 is uploaded to the server 30 from the first vehicle 10.

The same change as a change from the first embodiment to the third embodiment may be applied to the second embodiment.

The disclosure is not limited to the embodiments described above. For example, a plurality of blocks described in a block diagram may be combined with each other or one block may be divided. Instead of performing a plurality of steps described in a flowchart in a chronological order as in the description, the steps may be performed in parallel or in a different order in accordance with the processing capacity of a device performing each step or as needed. Other modifications without departing from the scope of the disclosure can also be made.

What is claimed is:

1. An information provision device comprising:
 a controller configured to detect installation of an anti-skid tool onto a vehicle from an image including at least a part of the vehicle and at least a part of a vicinity of the vehicle; and
 a communication unit configured to provide position information of the vehicle at a time of the installation of the anti-skid tool which is detected by the controller.

2. The information provision device according to claim 1, wherein the controller recognizes an action of a person in at least one of an inside of the vehicle and the vicinity of the vehicle from the image and determines whether the recognized action is an action of installing the anti-skid tool to detect installation of the anti-skid tool.

3. The information provision device according to claim 1, wherein the controller recognizes a tire of the vehicle from the image and determines whether the anti-skid tool has been installed onto the recognized tire to detect installation of the anti-skid tool.

4. The information provision device according to claim 1, wherein the controller estimates the position information of the vehicle, which the communication unit provides, from position information of another vehicle different from the vehicle in a case where the image is captured from the other vehicle.

5. A vehicle comprising:
 an imaging unit configured to capture an image; and
 the information provision device according to claim 1.

6. A driving assistance system comprising:
 the information provision device according to claim 1; and
 a driving assistance device configured to acquire the position information of the vehicle from the information provision device and present the position information of the vehicle to a driver of another vehicle different from the vehicle.

7. A map generation device comprising:
 a communication unit configured to acquire position information of a vehicle at a time of installation of an anti-skid tool in a case where the installation of the anti-skid tool onto the vehicle is detected from an image including at least a part of the vehicle and at least a part of a vicinity of the vehicle; and
 a controller configured to generate, based on the position information of the vehicle which is acquired by the communication unit, map information indicating a location at which the anti-skid tool needs to be installed.

8. A driving assistance system comprising:
 the map generation device according to claim 7; and
 a driving assistance device configured to acquire the map information from the map generation device and present the map information to a driver of another vehicle different from the vehicle.

9. A driving assistance device comprising:
 a communication unit configured to acquire position information of a vehicle at a time of installation of an anti-skid tool or map information in a case where the installation of the anti-skid tool onto the vehicle is detected from an image including at least a part of the vehicle and at least a part of a vicinity of the vehicle, the map information being generated based on the position information of the vehicle and indicating a location at which the anti-skid tool needs to be installed; and a controller configured to present information acquired by the communication unit to a driver of another vehicle different from the vehicle.

10. A vehicle comprising:

the driving assistance device according to claim 9; and an output unit configured to output the position information of the vehicle or the map information.

11. A driving assistance method comprising:

capturing an image including at least a part of a vehicle and at least a part of a vicinity of the vehicle by an imaging unit;

detecting installation of an anti-skid tool onto the vehicle from the image captured by the imaging unit by a controller; and outputting position information of the vehicle at a time of installation of the anti-skid tool which is detected by the controller or map information toward a driver of another vehicle different from the vehicle by an output unit, the map information being generated based on the position information of the vehicle and indicating a location at which the anti-skid tool needs to be installed.

* * * * *